United States Patent Office 3,792,106
Patented Feb. 12, 1974

3,792,106
CONVERSION OF OLEFINS
Robert B. Regier, Bartlesville, Okla., assignor to
Phillips Petroleum Company
No Drawing. Filed Oct. 4, 1971, Ser. No. 186,432
Int. Cl. C07c 3/62
U.S. Cl. 260—683 D                    8 Claims

ABSTRACT OF THE DISCLOSURE

A composition comprising tungsten oxide, zinc oxide and silica is a catalyst for converting olefins according to the olefin reaction.

BACKGROUND OF THE INVENTION

This invention relates to the conversion of olefins according to the olefin reaction, to catalysts therefor and to a method for modifying the activity of such catalysts.

Previously it has been found that the activity of olefin reaction catalysts can be modified by admixture with a double bond isomerization catalyst. For example, mixtures of olefin reaction catalysts with magnesium oxide are particularly effective in increasing conversion and/or widening the spread of products.

It has now been found that the activity of an olefin reaction catalyst can be modified by depositing zinc oxide on the surface thereof, as by impregnation. Such modification comprises an increase in double bond isomerization along with a reduction in olefin reaction activity. An advantage is in the substantial modification of the catalyst activity with a relatively small increase in catalyst weight and bulk. Even though zinc oxide is known as a double bond isomerization catalyst, it is surprising that such a substantial modification of the catalyst activity can be obtained with such a small amount of zinc oxide, particularly when not all isomerization catalysts give this result.

The term "olefin reaction," as used herein, is defined as a process for the catalytic conversion over a catalyst of a feed comprising one or more unsaturated compounds to produce a resulting product which contains at least 10 percent by weight of product compounds, which product compounds can be visualized as resulting from at least one primary reaction, as defined below, or the combination of at least one primary reaction and at least one unsaturated bond isomerization reaction, and wherein the sum of the compounds contained in the resulting product consisting of hydrogen, saturated hydrocarbons, and compounds which can be visualized as formed by skeletal isomerization but which connot be visualized as formed by one or more of the above-noted reactions, comprises less than 25 percent by weight of the total of said resulting product. Feed components and the unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or different molecules.

The olefin reaction has been designated by other names including for example, "olefin dismutation," "olefin metathesis," and "disproportionation." In the present application the terms olefin reaction, olefin dismutation, and olefin metathesis are used interchangeably to designate the reaction as defined hereinabove. The term disproportionation is used to define one aspect of the olefin reaction.

The terms "unsaturated compounds" and "unsaturated bond" as used in the above definition include both ethylenically unsaturated compounds and bonds "double bonds" and acetylenically unsaturated compounds and bonds "triple bonds."

The olefin reaction can be illustrated by the following reactions within the definition of the reaction:

(1) The disproportionation of an acyclic mono- or polyene having at least 3 carbon atoms into other acyclic mono- or polyenes of both higher and lower number of carbon atoms; for example, the disproportionation of propylene to produce ethylene and butenes; the disproportionation of 1,5-hexadiene to produce ethylene and 1,5,9-decatriene;

(2) The conversion of an acyclic mono- or polyene having 3 or more carbon atoms and a different acyclic mono- or polyene having 3 or more carbon atoms to produce different acyclic olefins; for example, the conversion of propylene and isobutylene to produce ethylene and isopentene;

(3) The conversion of ethylene and an internal acyclic mono- or polyene having 4 or more carbon atoms to produce other olefins having a lower number of carbon atoms than that of the acyclic mono- or polyenes; for example, the conversion of ethylene and 4-methylpentene-2 to produce 3-methylbutene-1 and propylene;

(4) The conversion of ethylene or an acyclic mono- or polyene having 3 or more carbon atoms and a cyclic mono- or cyclic polyene to produce an acyclic polyene having a higher number of carbon atoms than that of any of the starting materials; for example, the conversion of cyclooctene and 2-pentene to produce 2,10-tridecadiene; the conversion of 1,5-cyclooctadiene and ethylene to produce 1,5,9-decatriene;

(5) The conversion of one or more cyclic mono- or cyclic polyenes to produce a cyclic polyene having a higher number of carbon atoms than any of the starting materials; for example, the conversion of cyclopentene to produce 1,6-cyclodecadiene (continued reaction can give higher molecular weight materials);

(6) The conversion of an acyclic polyene having at least 7 carbon atoms and having at least 5 carbon atoms between any two double bonds to produce acyclic and cyclic mono- and polyenes having a lower number of carbon atoms than that of the feed; for example, the conversion of 1,7-octadiene to produce cyclohexane and ethylene;

(7) The conversion of one or more acyclic polyenes having at least 3 carbon atoms between any two double bonds to produce acyclic and cyclic mono- and polyenes generally having both a higher and lower number of carbon atoms than that of the feed material; for example, the conversion of 1,4-pentadiene to produce 1,4-cyclohexadiene and ethylene;

(8) The conversion of one or more aryl substituted acyclic mono-olefins to produce a diaryl substituted olefin; for example, the conversion of 1-phenylbutene-2 produces 1,4-diphenylbutene-2 and butene-2.

An object of this invention is to modify the activity of an olefin reaction catalyst. Another object of the invention is to provide a modified olefin reaction catalyst. Another object of the invention is to convert olefins according to the olefin reaction. Other objects, aspects and advantages of this invention are apparent to one skilled in the art from the disclosure, including the detailed description of the invention.

According to the invention a tungsten oxide on silica olefin reaction catalyst is modified by the inclusion of zinc oxide deposited on the surface thereof. Further according to the invention there is provided a composition comprising tungsten oxide on silica having zinc oxide deposited on the surface thereof. Further according to the invention olefins are converted according to the olefin reaction by contact with a catalyst comprising tungsten oxide on silica having zinc oxide deposited on the surface thereof.

The silica component of the catalyst can be any conventional catalyst grade silica. Some examples are precipitated silica gel, microspheroidal silica, flame hydrolyzed silica, and silica aerogels. These materials have appreciable surface area, usually in the range of 50 to 700 m.$^2$/g., and can range from fine powders to coarse granules. These materials often contain small amounts of compounds of aluminum and of sodium, in the order of a few tenths of a percent by weight, and smaller. Trace amounts of other metals, and such small amounts of these materials are acceptable.

Silica-alumina bases are known to have catalytic activity for various hydrocarbon reactions, such as cracking and polymerization. These reactions can be avoided in the present process by maintaining the alumina content below about 1 percent by weight, perferably below about ½ percent.

Bases having larger amounts of alumina can be utilized for the olefin reaction, but conditions must be selected to avoid undesired reactions. Such reactions can be avoided by using suitably low reaction temperatures and avoiding excessively long contact times. By careful selection of conditions, high conversion and high efficiency of the olefin reaction can be obtained with relatively high proportions of alumina in the base, for example, bases such as silica-aluminas which are conventional cracking or polymerization catalysts, and even with bases with larger proportions of alumina, including compositions which are preponderantly alumina. Preferably, however, the amount of any alumina is not more than 50 weight percent of the catalyst support.

The catalysts can contain other materials which do not substantially promote unwanted reactions. For example, the base can contain other materials in amounts which do not destroy the olefin reaction activity of the catalyst.

The tungsten oxide component of the catalysts of the invention can be incorporated onto the silica support by any suitable method, including, for example, impregnation, dry mixing and coprecipitation. The zinc oxide is deposited on the surface of the catalyst by impregnation. Both the tungsten and the zinc can be incorporated as an oxide or as a compound convertible to the oxide by calcination. When the tungsten component is incorporated by impregnation, the zinc compound can be incorporated before, at the same time or after the incorporation of the tungsten compound.

Generally the finished catalyst contains from about 0.1 percent to about 30 percent by weight of the tungsten component, calculated as the metal trioxide and based on the total weight of the tungsten component and the silica component although larger amounts can be used. In most instances, a proper amount of the promoter is from 1 percent to 20 percent. Excellent results have been obtained with silica-base catalysts containing about 2 to 15 percent by weight of tungsten oxide. In some instances excellent conversion and selectivity to desired products are obtained in the range of 6 to 12 percent by weight.

Generally the finished catalyst contains from about 0.05 to about 2, preferably from about 0.1 to about 0.5 weight percent of the zinc component, calculated as ZnO and based on the total weight of the tungsten oxide and the silica support.

The process is carried out by any suitable contacting technique, either batchwise or continuously, using a fixed catalyst bed, stirrer equipped reactor or other mobile catalyst contacting process. The conditions of the process including conditions of temperature, pressure and contact time, are selected to obtain a combination of conditions suitable for obtaining the olefin reaction. For example, temperatures in the range of about 400 to about 1100° F. and pressures in the range of about 0 to about 2000 p.s.i.g. are suitable.

The applicable unsaturated feedstocks are converted by the process of the present invention by contact with the catalyst, under reaction conditions, either batchwise or continuously using any suitable mode of contact or reaction apparatus. If desired, the feedstocks can be diluted with inert diluents or solvents such as saturated aliphatic hydrocarbons. In continuous processes, the feed rate will vary according to the feedstock being converted and the desired degree of conversion but will generally be in the range from about 0.5 to about 1000 WHSV. In batch operations, the reaction time can range from 0.1 to 20 hours.

Any olefin which is convertible according to the olefin reaction can be used in the process of the invention. Included among those which can be used are acyclic mono- and polyenes having at least 3 carbon atoms per molecule including cycloalkyl, cycloalkenyl, and aryl derivatives thereof; cyclic mono- and polyenes having at least 4 carbon atoms per molecule including alkyl and aryl derivatives thereof; mixtures of at least two of the above olefins; and mixtures of ethylene and at least one of the above olefins. Many useful reactions are accomplished with acyclic olefins having 3–30 carbon atoms per molecule and with cyclic olefins having 4–30 carbon atoms per molecule, mixtures thereof and mixtures with ethylene.

It has been found that within the scope of this invention certain olefins react at a faster rate than other olefins. Also, in employing certain olefins higher conversions are obtained than with other olefins under comparable reaction conditions. For example, the contact of a symmetrical monoolefin with a catalyst of the invention to give different olefin products (i.e., the reactions exemplified under number (1) above) apparently requires some double bond migration to take place before the disproportionation reaction proceeds at a significant rate. For similar reasons, the conversion of a mixture of ethylene and a 1-olefin proceeds at a slower rate and lower conversion than the conversion of a mixture of ethylene and an internal olefin. It has also been found that branching or the presence of inert polar substituents sometimes decrease the reactivity of a double bond in the feed olefin as the branching or polar substituent approaches the double bond. Accordingly, the present invention is directed primarily to the conversion of those olefins or combination of olefins which are capable of undergoing the olefin reaction to a significant degree when contacted with the catalyst of the present invention under reaction conditions suitable for effecting the olefin reaction.

Among the olefins which are capable of undergoing the olefin reaction to a significant degree are those contained in the following classes:

(1) Acyclic monoolefins, including those with aryl, cycloalkyl, and cycloalkenyl substituents, having 3–20 carbon atoms per molecule with no branching closer than about the 3-position to the double bond, no quaternary carbon atoms and no aromatic substitution closer than the 4-position to the double bond, and mixtures of such unsubstituted acyclic monoolefins. Some examples of these are propylene, pentene-1, pentene-2, butene-1, butene-2, 3-methylbutene-1, hexene-2, octene-4, nonene-2, 4-methylpentene-1, decene-3, 8-ethyldecene-2, dodecene-4, vinylcyclohexane, 4-vinylcyclohexene, eicosene-1, and the like.

(2) A mixture of ethylene and one or more acyclic unsubstituted internal monoolefins of (1). Some examples of such mixtures are ethylene and butene-2, ethylene and pentene-2, ethylene and hexene-3, ethylene and heptene-3, ethylene and 4-methylpentene-2, ethylene and octene-4, ethylene and dodecene-4, and the like.

(3) Acyclic, nonconjugated polyenes having from 5 to about 20 carbon atoms per molecule, containing from 2 to about 4 double bonds per molecule and having no double bond with branching nearer than the 3-position to that double bond, and having at least one double bond with no quaternary carbon atoms and no aromatic substitution nearer than the 4-position to that double bond, or mixtures of such polyenes. Some examples are 1,4-pentadiene, 1,5-hexadiene, 1,7-octadiene, 2,6-decadiene, 1,5,9-dodecatriene, 4-methylheptadiene-1,6, 1,6-octadiene, and the like.

(4) A mixture of ethylene and one or more acyclic polyenes of (3) which contain at least one internal double bond. Some examples are ethylene and 1,6-octadiene, ethylene and 1,5-decadiene, and the like.

(5) Cyclopentene.

(6) Cyclic and bicyclic monoolefins having 7 to 12 ring carbon atoms, including those substituted with up to 3 alkyl groups having up to about 5 carbon atoms, with no branching closer than the 3-position and with no quaternary carbon atoms closer than the 4-position to the double bond, and mixtures of such olefins including mixtures with cyclopentene. Some examples are cycloheptene, cyclooctene, 4-methylcyclooctene, 3-methyl-5-ethylcyclodecene, cyclononene, cyclododecene, norbornene, and the like.

(7) A mixture of one or more of the monocyclic olefins of (6) with either ethylene or with one or more unsubstituted acyclic monoolefins of (1). Some examples of these are ethylene and cycloheptene, ethylene and cyclooctene, propylene and cyclodecene, pentene-2 and cyclooctene, ethylene and cyclododecene, and the like.

(8) Cyclic and bicyclic nonconjugated polyenes having from 5 to about 12 ring carbon atoms, including those substituted with up to 3 alkyl groups having up to about 5 carbon atoms each, having at least one double bond with no branching closer than the 3-position and with no quaternary carbon atoms closer than the 4-position to that double bond, and mixtures thereof. Some examples of these are 1,5-cyclooctadiene, 1,5,9-cyclododecatriene, 1,4-cycloheptadiene, norbornadiene, and the like.

(9) A mixture of one or more monocyclic polyenes of (8) with one or more acyclic 1-olefins having from 2 to about 10 carbon atoms, having no branching nearer than the 3-position and no quaternary carbon atoms nearer than the 4-position to the double bond. Some examples of these are 1,5-cyclooctadiene and ethylene 1,5,9-cyclodecatriene and ethylene, 1,5,9-cyclododecatriene and pentene-1, and the like.

Preferred feeds for the present process are those olefinic compounds having 10 carbon atoms or less per molecule. Still more preferred are those having 6 carbon atoms or less per molecule.

The following example illustrates the process of the invention.

EXAMPLE

A $WO_3/SiO_2$ catalyst, containing about 4.3 weight percent $WO_3$ and which was active for olefin disproportionation, was treated with varying amounts of aqueous zinc nitrate followed by calcination at about 930° F. to convert the zinc to the oxide form. The resulting coprompted catalyst was then used for the disproportionation of butene-1. The butene-1 feed was passed over the catalyst in a fixed bed reactor at a temperature of about 842° F., at atmospheric pressure, and at a space rate of about 5 WHSV (weight of butene-1/weight of catalyst/hour). For purposes of comparison, magnesium oxide and cadmium oxide were added in the same manner to other portions of the same olefin disproportionation catalyst in place of the zinc oxide.

The results of these tests are shown in Table I below.

TABLE I

Disproportionation of butene-1 over $WO_3/SiO_2$ catalyst

| Added ZnO, weight percent | Conversion, percent | Product butene-1/butene-2, weight ratio |
| --- | --- | --- |
| 0 | 54 | 4.9 |
| 0.125 | 39 | 3.1 |
| 0.25 | 23 | 1.5 |
| 0.5 | 13 | 0.73 |
| 1.0 | 6 | 0.42 |
| 0.75 (MgO) | 3.5 | 3.5 |
| 0.75 (CdO) | (1) | (1) |

[1] Inoperable because CdO was reduced to metal and rapidly sublimed out of the reactor.

The data in the table above illustrate the effectiveness of the zinc oxide addition in the introduction of double bond isomerization activity into the catalyst system. The butene-1/butene-2 weight ratio column is a measure of such double bond isomerization activity, the smaller numerical ratio indicating the greater isomerization activity.

It is also seen from the table above that the similar addition of small amounts of MgO or CdO to the olefin disproportionation catalyst did not give equivalent results indicating the unpredictable nature of the present invention.

Other runs were made at each level of added ZnO from which curves of the hexene/pentene weight ratio at different disproportionation conversions were obtained. From these curves the hexene/pentene weight ratios at a constant disproportionation conversion of about 15 percent were determined. These ratios are presented in Table II. Each pentene disproportionation product arises from the disproportionation of one molecule of butene-1 and one molecule of butene-2. Hence, isomerization activity is necessary for the formation of pentenes and the ratios indicate the degree of double bond activity in the system, the lower numerical ratio of hexanes/pentenes indicating greater isomerization activity.

TABLE II

| Added ZnO, wt. percent: | Product, hexene/pentene, wt. ratio |
| --- | --- |
| 0 | 2.4 |
| 0.125 | 2.1 |
| 0.25 | 1.0 |
| 0.5 | 0.60 |
| 1.0 | 0.35 |
| 0.75 (MgO) | 2.2 |
| 0.75 (CdO) | (1) |

[1] Inoperable because CdO was reduced to metal and rapidly sublimed out of the reactor.

That which is claimed is:

1. A process for converting an unsaturated compound in the olefin reaction which comprises contacting at least one unsaturated reactant capable of undergoing the olefin reaction to a significant degree with a catalyst under conditions suitable for obtaining a product of the olefin reaction which, as defined herein, can be visualized as comprising the reaction between two first pairs of carbon atoms, the two carbon atoms of each first pair being connected by an olefinic double bond to form two new pairs from the carbon atoms of said first pairs, the two carbon atoms of each of said new pairs being connected by an olefinic double bond, said catalyst comprising tungsten oxide supported on a silica support and at least about 0.05 to about 2 percent by weight of zinc oxide (calculated as ZnO and based on the total weight of the tungsten oxide and the silica support) associated with said catalyst by impregnation.

2. The process of claim 1 wherein said unsaturated reactant is an olefin selected from the group consisting of acyclic mono- and polyenes having at least 3 carbon atoms per molecule including cycloalkyl, cycloalkenyl, and aryl derivatives thereof; cyclic mono- and polyenes having at least 4 carbon atoms per molecule including alkyl and aryl derivatives thereof.

3. The process of claim 1 wherein a mixture of ethylene with said at least one olefin is contacted with said catalyst.

4. The process of claim 2 wherein said temperature is in the range of 400 to 1100° F.

5. The process of claim 4 wherein said percent by weight of zinc oxide is in the range of about 0.1 to about 0.5.

6. The process of claim 1 wherein said percent by weight of zinc oxide is in the range of about 0.1 to about 0.5.

7. The process of claim 6 wherein the silica support contains not more than about 1 percent by weight of alumina.

8. The process of claim 7 wherein the silica support contains below about .5 percent by weight of alumina.

References Cited
UNITED STATES PATENTS

| | | | |
|---|---|---|---|
| 2,375,402 | 5/1945 | Corson et al. | 260—673.5 |
| 3,590,099 | 6/1971 | Banks | 260—683 |
| 2,353,552 | 7/1944 | Drennan | 260—683.2 |
| 3,600,456 | 8/1971 | Bradshaw | 260—683 |

PAUL M. COUGHLAN, JR., Primary Examiner

C. E. SPRESSER, JR., Assistant Examiner

U.S. Cl. X.R.

260—666 A, 668 R, 677 R, 678, 680 R